United States Patent [19]
Delplanque

[11] 3,931,962
[45] Jan. 13, 1976

[54] VISE FOR BIAS-CUTTING SAWING MACHINES

[75] Inventor: Fernand Delplanque, Nice, France

[73] Assignee: Mecaval International, Saint Chamond, France

[22] Filed: Apr. 26, 1974

[21] Appl. No.: 464,483

[30] Foreign Application Priority Data
May 10, 1973  France .............................. 37.17601

[52] U.S. Cl. .................... 269/55; 83/466; 83/471.3; 269/152; 269/261; 269/321 ME
[51] Int. Cl.² .......................................... B25B 1/22
[58] Field of Search ......... 269/55, 57, 61, 139, 151, 269/152, 164, 258, 259, 256, 261, 321 ME; 83/454, 455, 466, 471.3, 473, 485, 486, 581, 647

[56] References Cited
UNITED STATES PATENTS

| | | | |
|---|---|---|---|
| 1,111,386 | 9/1914 | Hutton | 269/259 |
| 2,174,837 | 10/1939 | Rasmussen | 83/581 X |
| 2,679,178 | 5/1954 | Odin | 269/152 X |

*Primary Examiner*—Roy Lake
*Assistant Examiner*—Neil Abrams
*Attorney, Agent, or Firm*—Miller, Frailey & Prestia

[57] ABSTRACT

The present invention concerns a new vise intended to be mounted on bias-cutting sawing machines, i.e., on circular saw machines for miter cutting metallic sections, utilizing pivotal movement of the saw and the holding device for the work piece. The holding device is supported by a pivotal frame movable about the vertical diametral axis of the saw. The invention is characterized by the fact that it provides means for the contact surfaces or jaw caps of the work holding device always to remain parallel to the axis of the work piece, regardless of the angle of orientation of the saw with respect to the work piece, such means being designed with the saw blade always passing as close as possible to the jaws of the vise.

10 Claims, 4 Drawing Figures

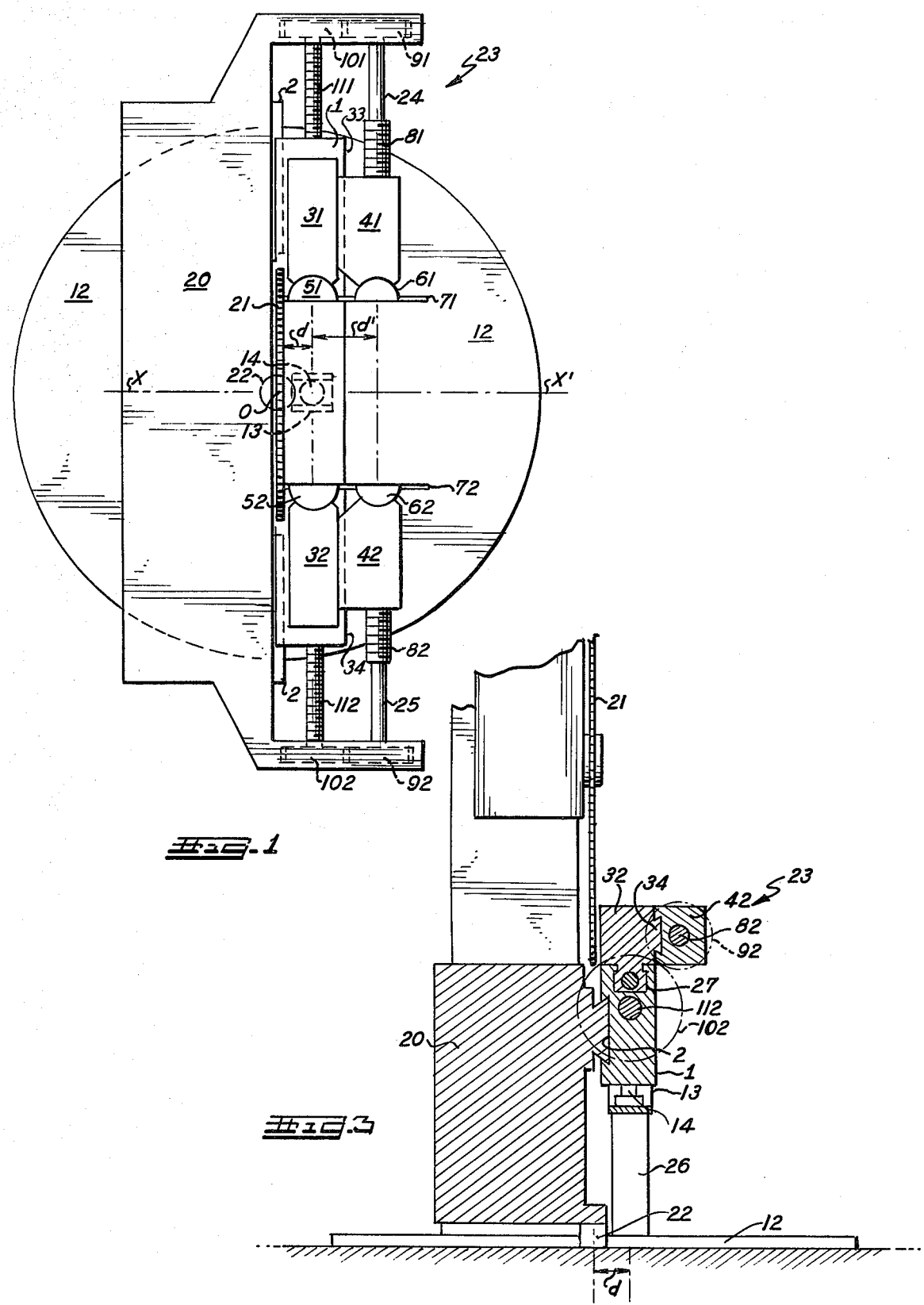

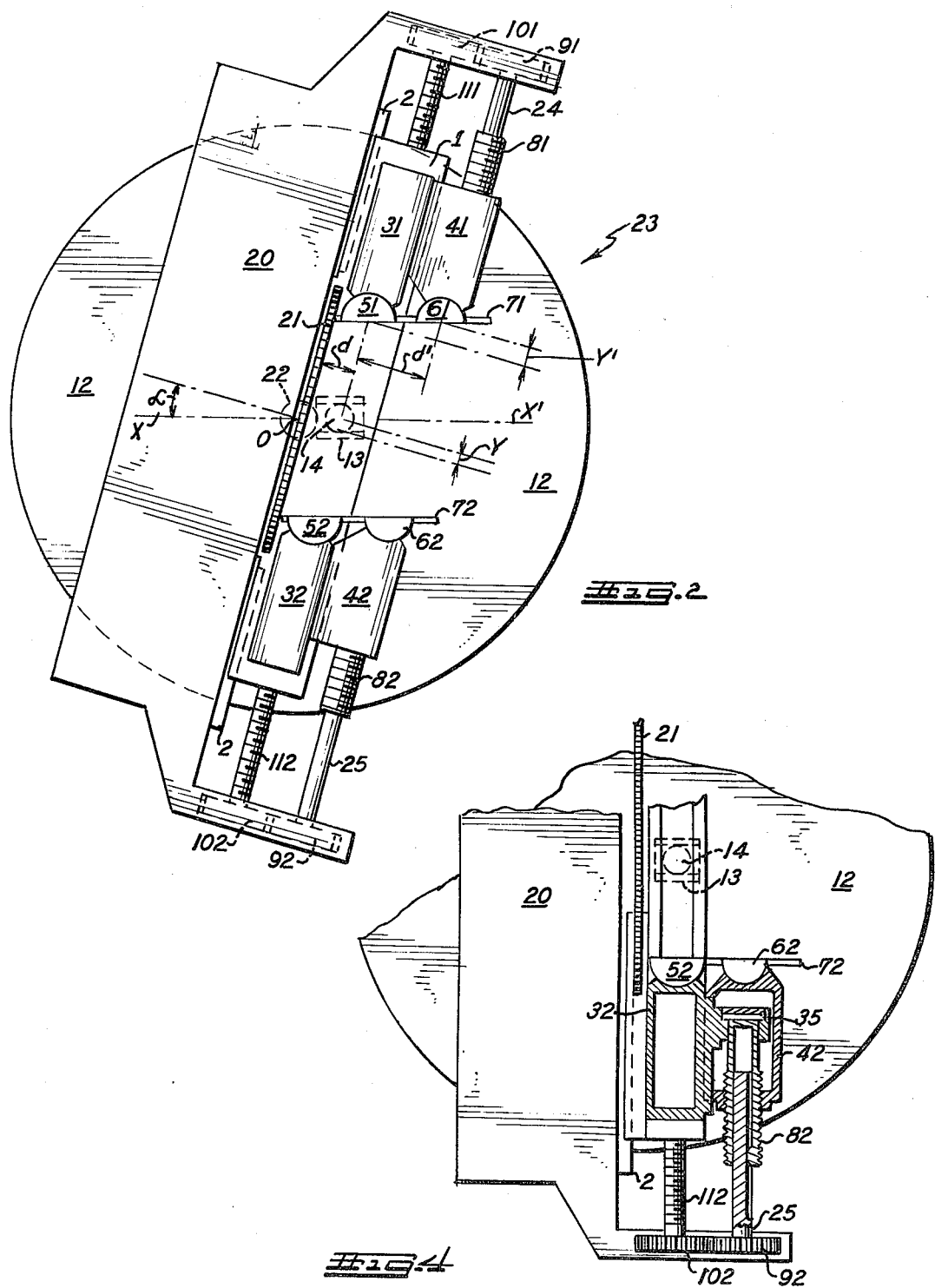

VISE FOR BIAS-CUTTING SAWING MACHINES

SUMMARY OF THE INVENTION

The invention concerns a new vise intended to be installed on bias-cutting sawing machines, i.e., on circular saw machines to miter cut metallic sections by pivotal movement of the saw and the holding device for the work piece. The holding device is supported by a pivotal frame movable about the vertical diametral axis of the saw.

The axis of the section of work piece rests upon a stationary bench. The vise holds the section by its jaw caps with means provided so that the surfaces of the jaw caps contacting the section remain parallel to the stationary axis of the section disposed on the bench.

Vises of this kind which are in use at present can be classified in three distinct groups.

Those of the first type require a manual adjustment to orient the jaws of the vise; this is the most primitive method.

There are also vises which use additional tightening devices that are located on both sides of the machine and which permit positioning of the jaws on the work piece which is already in place.

Finally, the most developed type has remote-controlled devices for orienting the jaws by independent motors.

These various types of vises suffer from the following disadvantages:

In the case of manual adjustment, the time which is needed in order to set up the machine is considerable. Furthermore, the precision which is obtained is only very approximate.

In the second case, the positioning of the jaws upon a work piece which is already in place implies conditions that are unsuitable for the cutting of short pieces.

Finally, the remote-controlled devices for orienting the jaws are a costly solution for the purpose of assuring synchronism with the orientation of the machine.

The present invention is intended to remedy these disadvantages.

The vise of the invention is characterized chiefly by the fact that it provides means for its work holding surfaces always to remain parallel to the stationary axis of the section resting upon the bench, regardless of the angle of orientation of the saw with respect to the section, these means being designed in such a way as to always allow the saw blade to pass as close as possible to the jaws of the vise.

More precisely, a combination of means has been provided for the following:

a. having the jaws of the vise move symmetrically with respect to the axis of the section or work piece, by sliding horizontally on a table which is itself slidable horinzontally while remaining parallel to the pivotal frame supporting the saw, the sliding motion of the table being such that it cooperates to maintain equidistant and parallel the work holding surfaces of the jaw caps with respect to the axis of the section;

b. extending the jaw caps along the section in a direction away from the saw, while keeping the parallel work contact surfaces of the jaw caps parallel to the axis of the section.

The main advantage of the present invention is therefore to obtain a synchronized orientation of the jaw caps, i.e., automatically achieving the constant parallelism of the jaw caps with respect to the longitudinal axis of the section by inexpensive mechanical means.

The invention will be better understood by reading the following description which provides a non-limited preferred embodiment of the invention.

DESCRIPTION OF THE VIEWS OF THE DRAWING

FIG. 1 is a plan view of a sawing machine provided with the new vise positioned for a 90° cut, and with the saw fully advanced to cutting position.

FIG. 2 is a plan view of the sawing machine with the vise positioned for bias-cutting.

FIG. 3 is a cross-section by the vertical plane of longitudinal axis XX' of FIG. 1.

FIG. 4 is a fragmentary cross section by the horizontal plane containing the axis of the auxiliary jaws of the vise.

DETAILED DESCRIPTION OF THE INVENTION

The sawing machine of the invention includes a frame 20 (FIG. 3) which supports the movable, rotatable circular saw 21 and rests on a circular platform 12 with capacity to be pivoted about a vertical pivot 22, which is co-axial with the vertical diameter 0 of the saw 21 (FIGS. 1, 2). The circular saw 21 is a conventional rotatable saw blade movable to and from the work piece to be cut. The saw is advanced to cut the work piece held in the vise, and then retracted following cutting. In FIG. 3, saw 21 is shown disposed in its fully advanced cutting position.

The vise 23 is supported by a table 1 which slides on guides 2 formed integral with the frame 20 of the machine. The vise 23 includes two main jaws 31, 32 (FIG. 1) with their usual hydromechanical devices (not shown) for concentric displacement and locking situated inside the jaws 31, 32, and two auxiliary jaws 41, 42 sliding longitudinally over guides 33, 34 formed integral with the main jaws 31, 32 respectively. The jaws 31, 32 slide within the grooves 27 provided in table 1, due to the action of the concentric displacement mechanisms which provide the tightening.

The jaws 31, 32 and 41, 42 are provided on their front faces with elongated, hemi-cylindrical, hinge-like joints 51, 52 and 61, 62, respectively, to support jaw caps 71, 72 which contact the work piece to be held, The jaw caps 71, 72 are attached rigidly to joints 51, 52, but they slide within transverse grooves (not shown) in the joints 61, 62. The pivotal axes of the joints 51, 52 and 61, 62 coincide with the front faces of the jaw caps 71 and 72, respectively.

The auxiliary jaws 41, 42 move together with the main jaws, but they include a compensating device for the purpose of orienting the jaw caps 71, 72 during turning of the frame 20 so that the jaw caps 71, 72 will always remain parallel to each other.

The center of rotation of the machine is the axis 0 of the pivot 22 which is affixed to the circular platform 12 upon which a female guide 13 (FIG. 3) is mounted at the top of a column 26. The longitudinal axis of the guide 13 and the axis 0 of the pivot 11 pass through axis XX'(FIG. 1), which is the longitudinal axis of the work feeding and removal conveyors (not shown) for feeding the sections to, and removing the cut pieces from, the sawing machine.

At the bottom of table 1 is a dependent stud 14 with its axis located at a distance $d$ from the axis 0, and which slides in the female guide 13.

To obtain a bias-cut in a section held stationary along the axis XX', the frame 20 is turned over the platform 12 about the axis 0. The problem then is to hold the jaws 31, 32, 41, 42 securely on the section while keeping the jaw caps 71, 72 parallel to the axis XX'. This is achieved by the mechanism which will now be described and whose operation will be explained later.

If one were concerned only with the jaws 31, 32, the mechanism could be limited to providing the whole motion for the jaws 31 and 32 by the table 1, which slides on the guides 2 of the frame 20. Such motion is obtained by the combination of the stationary column 26, whose axis is located in the vertical plane containing the longitudinal axis XX', and of the stud 14 integral with the bottom of table 1. The top of the column 26 supports the longitudinal guide 13 in which the stud 14 can move only parallel to the axis XX'. This displacement is very short. When the frame 20 is pivoted by an angle $\alpha$ about the axis 0 (FIG. 2), the stud 14 retained in the guide 13 forces the table 1 to move on the guides 2 by a distance expressed by:

$$y = d \tan \alpha$$

where $d$ is the distance between the longitudinal axis of the jaws 31, 32 and the median plane of the saw 21. In this motion, the hinge-like joints 51, 52 operate in such a way that the jaw caps 71, 72 remain parallel to the axis XX'. Furthermore, during this pivotal motion, the hydromechanical devices (not shown) must be activated, because the distance between the jaws 31, 32 increases by the following:

$$2y = 2d \tan \alpha.$$

But, in addition to the jaws 31, 32, the jaws 41, 42, whose longitudinal axis is at a distance $d_1$ from the median plane of the saw 21, must be moved. To obtain the displacement $y_1 = d_1 \tan \alpha$, one could design a device similar to the one just described, but it cannot be done for practical reasons of obstruction. It is preferable to obtain a displacement $y'$ for the jaws 41, 42, with respect to table 1, such displacement $y'$ of jaws 41, 42 being determined for their longitudinal axis which is at a distance $d'$ from the longitudinal axis of the jaws 31, 32. One can further see that if $$y = d \tan \alpha \quad y_1 = d_1 \tan \alpha \quad d_1 = d + d'$$

then $$y_1 = (d + d') \tan \alpha = (d + d') \frac{y}{d} = \frac{(d + d') y}{d}$$

which means that $y_1$ is proportional to $y$. In other words, the displacement $y_1$ or $y'$ of the jaws 41, 42 is a linear function of the displacement of the jaws 31, 32. There is needed, therefore, a mechanism to provide for the jaws 41, 42 a displacement proportional to the displacement of the jaws 31, 32 with respect to the frame 20. To obtain this result, I use a device comprising the following:

Two reversible screws 111 and 112 which are mounted on the frame 20 parallel to and below the jaws 31, 32 (FIG. 3), and which threadingly engage and turn within the table 1 in such a way as to detect any displacement of table 1 with respect to the frame 20 and to translate such displacements into an angular rotary movement proportional to the algebraic value of said displacement, Two identical gears 101 and 102 which are locked respectively on the outer ends of screws 111 and 112, Two identical gears 91 and 92 meshing respectively with the gears 101 and 102, Two fine pitch screws 81 and 82 turned respectively by the gears 91 and 92 by means of telescopic shafts 24 and 25 and turning in the jaws 41, 42, the screws 81, 82 having threads of the same pitch and in the same direction. The screws 81, 82 are supported on the jaws 31, 32 by means of thrust bearings such as 35. As shown in FIG. 4, the screw 82 is hollow and receives telescopically the shaft 25, to which gear 92 is affixed. Shaft 25 is provided with an elongated, axially-extending keyway for the sliding reception of an axially-extending key mounted internally of screw 82. A similar slidable key-keyway arrangement connects shaft 24 to screw 81. The screws 81, 82 engage threadingly within internally threaded apertures in the auxiliary jaws 41, 42, in the manner illustrated in FIG. 4.

With this arrangement, and by making a judicious selection of the pitches for the screws 111 and 112, 81 and 82, and of the reduction ratios of the gears 91 and 101, 92 and 102, when the frame 20 turns around the axis 0 by an angle $\alpha$, the cooperation of the stud 14 with the guide 13 will cause a displacement $y$ of the table 1 with respect to the frame 20 on the guides 2. The displacement $y$ of the table 1 determines the angular movement of the reversible screws 111 and 112, of the gears 91 and 101, 92 and 102 and of the screws 81 and 82, which results in producing a displacement $y'$ of the jaws 41, 42 with respect to the vise 23. This displacement $y'$ is such that the jaw caps 71, 72 remain parallel to the axis XX'.

I claim:

1. A vise for a bias-cutting sawing machine for the miter cutting of elongated metallic sections, in which the saw is pivotable relative to the longitudinal axis of the section to be cut, said vise including
   a. a pivotal support frame for the saw,
   b. a pair of axially spaced main jaws,
   c. means connecting the main jaws to the frame and operative to permit the main jaws to move axially relative to each other when the frame is pivoted preparatory to miter cutting,
   d. a pair of spaced auxiliary jaws, said auxiliary jaws being movable relative to the main jaws,
   e. means slidably connecting each auxiliary jaw to one of the main jaws,
   f. spaced parallel jaw caps mounted on the main and auxiliary jaws for holding a metallic section during cutting, each jaw cap interconnecting a main jaw to its slidably connected auxiliary jaw, and
   g. means automatically operative to maintain the jaw caps parallel to each other and to the longitudinal axis of the section to be cut when the frame is pivoted preparatory to miter cutting.
2. The vise of claim 1, further including
   a. a table mounted movably on the support frame,
   b. stationary table displacement means operative to move the table relative to the frame when the frame is pivoted preparatory to miter cutting and
   c. guide means connecting the main jaws to the table and operative to permit the main jaws to move axially away from each other when the frame is pivoted preparatory to miter cutting.
3. The vise of claim 2, wherein the table displacement means comprises
   a. a stationary column mounted intermediate the main jaws and
   b. a guide formed in the column, said guide extending in a direction parallel to the jaw caps and engagable with a dependent stud affixed to the table.

4. The vise of claim 1, further including
   a. guide means connecting the auxiliary jaws to the main jaws and operative to permit the auxiliary jaws to move axially relative to the main jaws when the frame is pivoted and
   b. mounting means for the jaw caps affixing the jaw caps permanently to the main jaws and mounting the jaw caps movably relative to the auxiliary jaws.

5. The vise of claim 1, wherein the jaw caps include elongated, opposing work holding surfaces for holding a metallic section during cutting, said work holding surfaces extending parallel to the longitudinal axis of the section to be cut.

6. The vise of claim 1, wherein the means automatically operative to maintain the jaw caps parallel includes hinge-like joints interposed between each jaw cap and the main and auxiliary jaws on which the jaw cap is mounted, said hinge-like joints being operative to maintain the jaw caps equidistant with respect to the longitudinal axis of the section to be cut.

7. A vise for a bias-cutting sawing machine for the miter cutting of elongated metallic sections, in which the saw is pivotable relative to the longitudinal axis of the section to be cut, said vise including
   a. a pivotal support frame for the saw,
   b. a table mounted slidably on the frame,
   c. stationary table displacement means operative to move the table relative to the frame when the frame is pivoted preparatory to miter cutting,
   d. a pair of axially spaced main jaws,
   e. guide means connecting the main jaws to the table and operative to permit the main jaws to move axially away from each other when the frame is pivoted preparatory to miter cutting,
   f. a pair of spaced auxiliary jaws,
   g. guide means connecting each auxiliary jaw to a main jaw and operative to permit the auxiliary jaws to move relative to their main jaws when the frame is pivoted,
   h. spaced parallel jaw caps mounted on the main and auxiliary jaws for holding a metallic section during cutting, each jaw cap being affixed permanently to one of the main jaws and connected movably to the associated auxiliary jaw, and
   i. means for maintaining the jaw caps parallel to each other and the longitudinal axis of the section to be cut when the frame is pivoted preparatory to miter cutting.

8. The vise of claim 7 wherein the means for maintaining the jaw caps parallel includes
   a. reversible screws supported by the frame and engagable threadingly with the table,
   b. screws engagable threadingly with the auxiliary jaws and
   c. separate gears connected to the reversible screws and to the screws engaging the auxiliary jaws,
   d. said separate gears being mounted in gear meshing relationship to connect drivingly each reversible screw to an auxiliary jaw screw.

9. The vise of claim 8, wherein the means for maintaining the jaw caps parallel further includes hinge-type joints interposed between each jaw cap and the jaws on which the cap is mounted, said joints being operative to maintain the jaw caps equidistant with respect to the longitudinal axis of the section to be cut.

10. The vise of claim 9, wherein the jaw caps include elongated, opposing work holding surfaces for holding a metallic section during cutting, said work holding surfaces extending parallel to the longitudinal axis of the section to be cut.

* * * * *